US009706155B2

(12) United States Patent
Mountain

(10) Patent No.: US 9,706,155 B2
(45) Date of Patent: Jul. 11, 2017

(54) AUTOMATIC SEARCH METADATA FOR RELATED MEDIA PROGRAMS

(71) Applicant: ECHOSTAR UK HOLDINGS LIMITED, Keighley (GB)

(72) Inventor: Dale Llewelyn Mountain, West Yorkshire (GB)

(73) Assignee: ECHOSTAR UK HOLDINGS LIMITED, Keighley (GB)

( * ) Notice: Subject to any disclaimer, the term of this patent is extended or adjusted under 35 U.S.C. 154(b) by 17 days.

(21) Appl. No.: 13/630,967

(22) Filed: Sep. 28, 2012

(65) Prior Publication Data
US 2013/0086614 A1 Apr. 4, 2013

(30) Foreign Application Priority Data

Sep. 30, 2011 (GB) .................................... 11183546

(51) Int. Cl.
*H04N 21/84* (2011.01)
*H04N 5/445* (2011.01)
(Continued)

(52) U.S. Cl.
CPC ... *H04N 5/44582* (2013.01); *H04N 21/42212* (2013.01); *H04N 21/4668* (2013.01); *H04N 21/4828* (2013.01); *H04N 21/84* (2013.01)

(58) Field of Classification Search
CPC ......... H04N 21/42212; H04N 21/4668; H04N 21/4828; H04N 5/44543
(Continued)

(56) References Cited

U.S. PATENT DOCUMENTS 5,317,505 A * 5/1994 Karabed ................. A63F 13/06
273/148 B
6,460,183 B1 * 10/2002 Van Der Vleuten .......... 725/139
(Continued)

FOREIGN PATENT DOCUMENTS

| CA | 7 791 026 A1 | 3/2013 |
| EP | 1 528 484 A2 | 5/2005 |

(Continued)

OTHER PUBLICATIONS

Extended European Search Report for corresponding European Application No. 11183546.8, mailed Feb. 27, 2012, 8 pages.
(Continued)

*Primary Examiner* — Nathan Flynn
*Assistant Examiner* — Tung T Trinh
(74) *Attorney, Agent, or Firm* — Kilpatrick Townsend & Stockton LLP

(57) ABSTRACT

Embodiments of the invention provide a method for searching program metadata using a media device, such as a set-top-box, to search for other programs related to a particular program. Program metadata is received at the media device, the program metadata comprising a plurality of data fields populated with accompanying data for each of a plurality of television programs. The media device is controlled by an input device, such as a remote control, and an input, such as a button, of the input device is associated with a data field. It is determined when an input, associated with a data field, is activated and in response the accompanying data within the associated data field, for a first program, is compared with the corresponding accompanying data of a plurality of other television programs. Data is then presented to the user, relating to those television programs having substantially equivalent data in the selected data field to the
(Continued)

| Input button | Data field |
|---|---|
| Red | Program title |
| Blue | Program category |
| Green | Main actor(s) |
| Yellow | Director |
| # | Leading female actor |
| * | Leading male actor | selected program. A corresponding apparatus is also provided.

9 Claims, 3 Drawing Sheets

(51) Int. Cl.
*H04N 21/466* (2011.01)
*H04N 21/482* (2011.01)
*H04N 21/422* (2011.01)

(58) Field of Classification Search
USPC .......................................................... 725/53
See application file for complete search history.

(56) References Cited

U.S. PATENT DOCUMENTS

| | | | | |
|---|---|---|---|---|
| 6,476,825 B1* | 11/2002 | Croy | ............... | H04N 5/4403 348/14.05 |
| 6,973,663 B1* | 12/2005 | Brown | ............... | G06F 3/0482 348/E7.06 |
| 8,234,335 B1* | 7/2012 | Haldar | ............... | H04L 65/4061 709/204 |
| 2001/0003213 A1 | 6/2001 | Marics | | |
| 2002/0015064 A1* | 2/2002 | Robotham | ............ | G06F 3/0481 715/863 |
| 2003/0023976 A1* | 1/2003 | Kamen | ................ | G06F 3/0482 725/53 |
| 2004/0073926 A1* | 4/2004 | Nakamura | ......... | H04N 5/44543 725/53 |
| 2004/0193426 A1* | 9/2004 | Maddux | ................. | G06Q 30/02 704/275 |
| 2005/0097606 A1* | 5/2005 | Scott, III | ........... | H04N 5/44543 725/52 |
| 2006/0195447 A1* | 8/2006 | Chang | ................ | H04N 5/44543 |
| 2007/0186241 A1* | 8/2007 | Sugimoto | ........... | H04N 5/4403 725/46 |
| 2007/0283393 A1* | 12/2007 | Kikinis | .............. | H04N 5/44543 725/53 |
| 2008/0060008 A1 | 3/2008 | Wang et al. | | |
| 2008/0066099 A1 | 3/2008 | Brodersen et al. | | |
| 2009/0058709 A1* | 3/2009 | Ueno et al. | ................ | 341/176 |
| 2009/0138441 A1* | 5/2009 | Valentine et al. | ............... | 707/3 |
| 2010/0031282 A1* | 2/2010 | Torimaru | ........... | H04N 5/44543 725/9 |
| 2010/0123834 A1* | 5/2010 | Brodersen | .............. | G08C 19/28 348/734 |
| 2011/0113438 A1* | 5/2011 | Patil et al. | ......................... | 725/1 |
| 2011/0125724 A1* | 5/2011 | Mo | ................... | G06F 17/30867 707/706 |

FOREIGN PATENT DOCUMENTS

| | | |
|---|---|---|
| EP | 1 653 733 A2 | 5/2006 |
| EP | 2 575 357 A1 | 3/2013 |
| MX | 2012011037 | 1/2013 |
| WO | 2007/054687 A1 | 5/2007 |

OTHER PUBLICATIONS

Examination Report for European Application No. 11183546.8 dated Apr. 23, 2015, 5 pages.

* cited by examiner

| Input button | Data field |
|---|---|
| Red | Program title |
| Blue | Program category |
| Green | Main actor(s) |
| Yellow | Director |
| # | Leading female actor |
| * | Leading male actor |

*FIG. 2*

| Syntax | Number of bits | Identifier |
|---|---|---|
| extended_event_descriptor () { | | |
|     descriptor_tag | 8 | uimsbf |
|     descriptor_length | 8 | uimsbf |
|     descriptor_number | 4 | uimsbf |
|     last_descriptor_number | 4 | uimsbf |
|     ISO_639_language_code | 24 | bslbf |
|     length_of_items | 8 | uimsbf |
|     for ( i=0;i<N;i++) { | | |
|         item_description_length | 8 | uimsbf |
|         for (j=0,j<N;j++) { | | |
|             item_description_char | 8 | uimsbf |
|         } | | |
|         item_length | 8 | uimsbf |
|         for (j=0;j<N;j++) { | | |
|             item_char | 8 | uimsbf |
|         } | | |
|     } | | |
|     text_length | 8 | uimsbf |
|     for (i=0;i<N;i++) { | | |
|         text_char | 8 | uimsbf |
|     } | | |
| } | | |

*FIG. 3*

AUTOMATIC SEARCH METADATA FOR RELATED MEDIA PROGRAMS

The present application claims priority to European patent application No. 11183546.8, filed on Sep. 30, 2011, and entitled "Automatic Search," the entire disclosure of which is incorporated herein by reference.

FIELD OF THE INVENTION

The present invention relates to a method of searching television programs, particularly within an electronic program guide (EPG).

BACKGROUND OF THE INVENTION

Modern television services, such as satellite, cable or other types of digital transmission services, provide the user with electronic program guides (EPG), also sometimes referred to as interactive electronic program guides (IPGs). EPGs are executed on a user's television receiver, such as a set-top-box (STB) and provide an interface for the user to access program data such as start times, program lengths, titles and so on. As the number of channels has increased, so has the volume of EPG data.

In addition to typical EPG data such as program title, start/end time, titles and so on it is becoming common to send additional data containing further information relevant to individual programs. This additional data is provided as metadata, the term generally indicative of data that describes other data. EPG type data can be considered as metadata, as can other information related to a program such as category, featured actors, production date, director and so on. This type of metadata, containing attributes or descriptions of a television program will be referred to as program metadata.

Unfortunately, whilst the amount of program metadata being sent to television receivers had increased, the ability to search such data has not improved sufficiently to allow efficient or easy use of any additional program metadata.

United States Patent Application US 2008/0060008 describes a method in which the EPG metadata broadcast to a television receiver is edited to include additional metadata, and specifically keywords associated with each television program. However, the resulting search performed by the television receiver is intended only to identify similar programs by matching multiple predefined keywords. This means that the user is only able to search for similar programs as defined by previously created and categorised keywords, according to a predetermined importance level.

What is required is a method of searching for programs using program metadata in an intuitive and easy to use manner.

SUMMARY OF THE INVENTION

The invention is defined in the claims, to which reference is now directed. Preferred features are set out in the dependent claims.

Embodiments of the invention provide a method for searching program metadata using a media device, such as a STB, to search for other programs related to a particular program. The media device is controlled by an input device, such as a remote control, and has access to program metadata. The program metadata comprises a plurality of data fields populated with accompanying data describing each data field for each of a plurality of television programs. An input of the input device, such as a button of a remote control, is associated with a particular data field of the metadata. The method further includes determining when the input of the input device is activated, and in response comparing the accompanying data of the data field for a first program with the corresponding data of the other programs, or at least a subset of the other programs. As a result, the user can search for programs with corresponding or similar metadata descriptions for a single specific data field at the press of a single button.

Preferably the method may be expanded such that various different data fields can be searched. This is achieved by associating one or more further inputs of the input device with one or more respective further data fields. The method further includes determining when one of these inputs of the input device is activated, and in response comparing the accompanying data of the data field associated with the activated input, for a first program, with the corresponding accompanying data of other programs, preferably being a subset of the plurality of television programs.

The method can, preferably, be further expanded by combining searches. This can be accomplished by allowing a further search, within the results of an earlier search, based on determining whether a further input of the input device is pressed or activated. The subsequent search is preferably carried out in the same way as the previous search, but is limited to the metadata of those programs identified/displayed in the earlier search. Alternatively, or in addition, the method may involve waiting a predetermined period of time after determining an input of the input device has been activated before the step of comparing the accompanying data is performed. During the predetermined period, it is determined whether one or more further inputs of the input device are activated. If they are, then the comparing step is also carried out for the further data fields associated with the one or more further inputs. The results presented to the user include data only from those programs having equivalent data for all of the relevant data fields.

Logical operators may be associated with an input of the input device to provide expanded search functionality. In particular an "OR" operator allows an OR search between two or more data fields to be performed.

The program to form the basis of the search, with which corresponding entries for a particular data field are compared, may be selected by controlling the media device to output the program to be selected to a display. In other words, where the media device is a STB or similar sort of broadcast media decoding device, the program being output at the time the relevant input of the input device is activated will be the selected program. Alternatively, or in addition, a program may be selected within a menu or list such as an EPG, for example by highlighting the desired program before activating the relevant input of the input device.

A corresponding apparatus may also be provided for searching program metadata. The apparatus comprises a media device and an input device, having a plurality of inputs, for controlling the media device. The apparatus further comprises an input, located at the media device, for receiving program metadata comprising a plurality of data fields populated with accompanying data for each of a plurality of television programs. At least one memory is provided for storing the metadata, and for storing associations between one or more inputs of the input device and one or more respective data fields. These two functions may be performed by the same memory or different memories. A processor is also provided, the processor being configured to determine when a given input of the input device is activated, and in response to compare the accompanying data of the data field associated with the input based on the associations stored in memory, for a first program, with the corresponding accompanying data of the plurality of television programs or at least a subset thereof. The processor is further configured to control a display to present data relating to those television programs having equivalent data in the data field.

The associations between the one or more inputs of the input device and the one or more respective data fields may be provided in the input device or in the media device. Where the memories and processors are all contained within the media device, the input device need not be considered a part of the apparatus since all the corresponding steps outlined above take place at the media device.

A corresponding computer program may also be provided which when executed on a media device such as the media device described above or below causes it to undertake any of the methods detailed above or below.

BRIEF DESCRIPTION OF THE DRAWINGS

Examples of the invention will now be described in more detail with reference to the drawings in which:

FIG. 2: is a table showing an example of associations between input device inputs and metadata fields;

FIG. 3: is a table showing the format of the EIT extended event descriptor; and

DETAILED DESCRIPTION OF PREFERRED EMBODIMENTS

Figure 1:
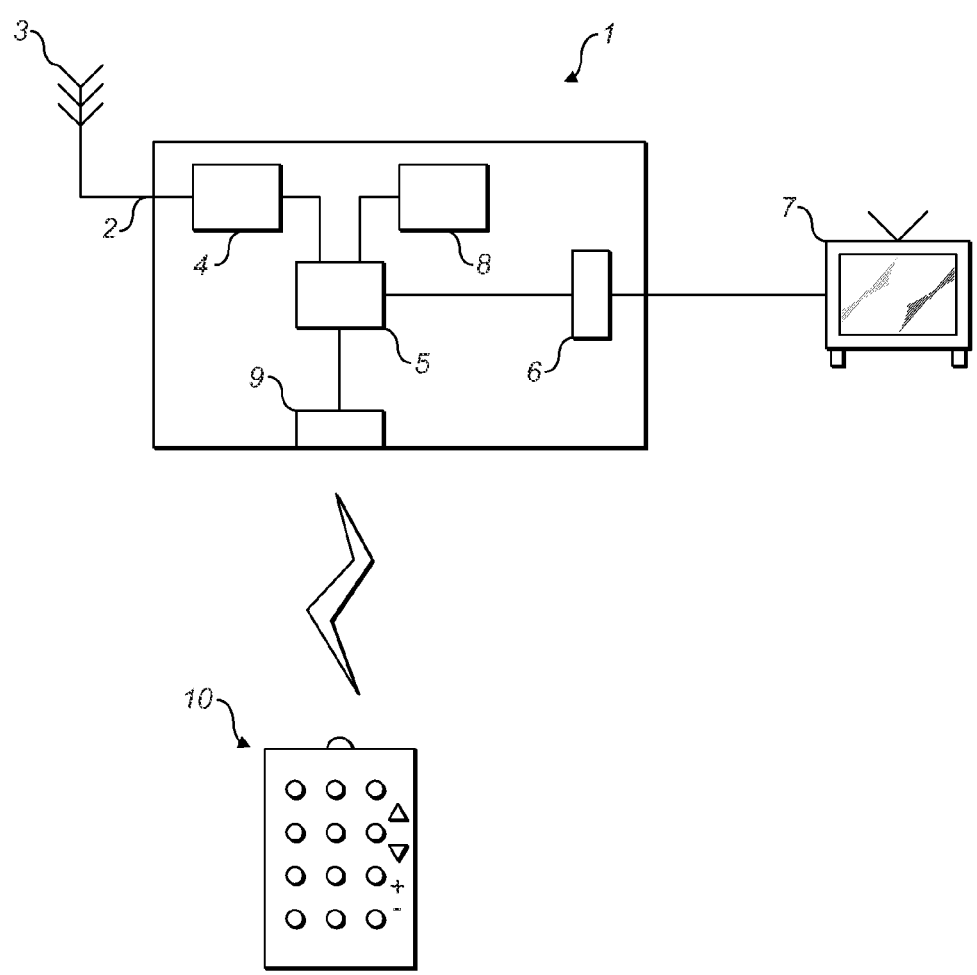
FIG. 1: is a diagram of a STB which may be used to implement embodiments of the invention.

A first example of the invention may be implemented with a STB of the sort shown in FIG. 1. The STB 1 comprises an input 2 for receiving broadcast signals including encoded media content, such as video and audio content, via a receiver 3 such as an antenna or satellite dish. A tuner and demodulator 4 may be provided to tune to and amplify a particular broadcast frequency and to demodulate the modulated broadcast signal and convert it into a digital signal for subsequent processing. A processor or processing unit 5 is provided for performing a number of tasks. The processor may include a CPU for running the STB software and for controlling and coordinating the other STB components. The processor also includes an AV decoder, which is responsible for decoding the demodulated audio and video data and providing to an output unit 6 for subsequent display on a display device such as a television screen 7.

The STB 1 also includes an interface 9 for receiving user instructions. Preferably the interface 9 is a wireless receiver for receiving instructions from a remote control 10, although buttons on the STB could also be used.

In addition to audio/video data the STB may also receive, by broadcast or other means such as over the internet, metadata relating to a plurality of television programs. After being decoded the metadata may be stored by the processor in a memory, such as a RAM or hard drive, for subsequent use by the processor when populating an EPG.

EPG metadata format and content varies according to the broadcast standard being employed to transmit the data and the standard of system information (SI) used. Embodiments of the invention will primarily be described in relation to MPEG2 encoded broadcasts using the Digital Video Broadcasting (DVB) standard, but it will be appreciated that other standards, such as the Japanese Integrated Services Digital Broadcasting (ISDB) or the North American Advance Television Systems Committee (ATSC), could be equally used for embodiments of the invention.

In general, system information can be classified into two categories. The first is system information used primarily by receivers, such as information to de-multiplex and otherwise process the video/audio/data streams. The second is system information used primarily by viewers/users. All system information begins with the MPEG2 defined Program Specific Information (PSI). The PSI comprises the Program Association Table (PAT), the Program Map Table (PMT), the Optional Conditional Access Tables (CAT) and the optional Transport Stream Description Tables. These tables are well known in the art and will not be discussed further. In addition to the basic MPEG-2 defined PSI, there are complementary System Information (SI) technologies that build upon the MPEG-2 PSI. One of these is the DVB Service Information (DVB-SI).

DVB-SI provides data needed to provide identification services and events for the user. The data is structured as nine tables: Bouquet Association Table (BAT); Service Description Table (SDT); Event Information Table (EIT); Running Status Table (RST); Time and Date Table (TDT); Time Offset Table (TOT); Stuffing Table (ST); Selection Information Table (SIT); and Discontinuity Information Table (DIT). The information transmitted by these SI tables is given by descriptors. Each descriptor starts with a "descriptor-tag", which uniquely identified the type of descriptor, and a "descriptor-length". Different descriptors are used to describe information carried by different SI tables.

Using a SI system such as DVB-SI increases the amount of metadata that can accompany a particular television program for use in populating an EPG. The short event descriptor, located within the EIT, provides a data field containing the name of the program along with a short description of the program in text form. The extended event descriptor, also located within the EIT, can provide a detailed text description of a program. Multiple extended event descriptors can be used if necessary. According to the DVB-SI standard, text information can be structured into two columns, one giving an item description field, or data field, and the other providing the accompanying data in text format. These data fields may be used to include program title, starring actors, director, program category and so on. Thus programs can be broadcast to a media device such as a STB with accompanying metadata, including various data fields and accompanying program data about a given program.

The processor 5 which can perform the function of extracting metadata from the EIT in order to populate an EPG and can also store, in memory 8, an association between a particular input or input button on remote control 10 and a particular item description field, or data field, within the EIT and particularly within a short event descriptor or extended event descriptor. In response to the STB receiving a communication indicating that the particular input/input button has been activated/pressed by a user, the processor performs a look up on a database in memory 8 to determine which data field is associated with that button. The processor then performs a search, within stored EIT tables, for accompanying data within the same data field and identifies any matches.

The resulting matches are presented to the user. This can be in the form of a list that the user can then manipulate to access details of any of the results. For example, the user may select one of the results to view the program if it is currently being shown. Alternatively the user may select one of the results to record onto a memory device such as a hard disk, if the STB has digital video recording (DVR) or Personal Video Recording (PVR) capability, the next time the program is scheduled to start.

The matches may be presented to the user within the EPG, by highlighting on the EPG display the relevant programs found within the search. The searches can therefore be initiated when the user is accessing the EPG. However, searches may also be performed when the user is watching a program, the resulting list being displayed over the top of the program or within a pop up window, for example. Alternatively, initiating a search when the user is watching a program may initiate the EPG and display the results using the EPG as described above.

The processor 5 may be configured to store more than one set of associations between a button on the remote control 10 and a particular metadata field in the memory. A first button may be associated with a first specific data field; a second button may be associated with a second specific data field and so on. An example of this is shown in FIG. 2, which shows a possible table of the sort stored in memory 8.

In the example of FIG. 2 a first button, the "Red" button, is associated with the data field "Program title". Pressing the Red button causes the remote control to send a signal indicative of such an action, which is received by the STB interface, for example an infra red receiver/detector. In response to receiving the signal from the remote control the processor initiates a look-up in the table on memory 8. The look-up reveals that the red button is associated with the Program Title metadata field. The processor then initiates a search of metadata for programs having matching text data within the Program Title data field to the selected program. Any resulting matches are displayed to the user in the manner indicated above/below. Pressing another button, such as the "Yellow" button results in a similar search for programs having matching text data within the "Director" data field.

As mentioned above, a program to be the subject of a search may be selected in a number of ways. The selected program may be the program being watched by the user when the search input button is pressed. For example, the user may be watching the program "Blackadder". Pressing any of the shortcut search buttons during program viewing results in a search based on the data populating the available data fields in metadata for the particular episode of Blackadder being watched.

Alternatively, if the user is using the EPG, a program may be selected by highlighting it using a cursor within the EPG or any other manner of indicating a given program. Again, the user may highlight the program Blackadder within the EPG. Subsequent pressing of any of the shortcut search buttons results in a search based on the particular highlighted program—in this example the highlighted episode of Blackadder.

Although embodiments of the invention offer a simple way of performing a search of metadata fields for a selected program, it is possible to combine searches to generate complex result lists. For example, pressing a first search shortcut button may initiate a first search based on the first data field associated with the first button pressed. Pressing a subsequent second shortcut button may initiate a sub-search of the results of the first search. A sub-search of this type may be initiated by pressing a subsequent shortcut button within a predetermined period (such as 10 seconds or less) after the search has finished. This allows the user to refine results in a very straightforward manner using a control device with limited inputs to generate a complex search. As a specific example the user may initiate a first search on the selected program "Gangs of New York", pressing the "Yellow" button, using the example of FIG. 2, to search for other programs having the same director. The results list would include all programs, found within the available metadata, with the same director. The user may then initiate a sub-search of the results, pressing the "*" button for films in which the leading male actor is common to the originally selected program "Gangs of New York". The results, being all programs featuring Martin Scorsese as director and Leonardo Di Caprio as the leading male actor, are then displayed.

This type of combined search can be performed by allowing a further search within the results of the first search, as exemplified above. Alternatively, or in addition, a predetermined time delay can be provided between the processor detecting a search button has been pressed and initiating the search. If during the predetermined time delay one or more subsequent search shortcut buttons are pressed, the processor may be configured to combine the two or more searches to list results matching all of the data fields of the selected matching program.

Searches may be provided with additional functionality by adding function shortcut keys to the interface device. An input such as a button on the remote control may be mapped, in memory 8, to a search operator such as an "OR" operator such that data fields can be searched in an OR manner. For example, the user can search for programs with matching leading actor OR director to the selected program. Again, this functionality may preferably be enacted with a predetermined time delay from receiving the first search instruction or finishing the first search such that a more complex search can be formed using a combination of inputs/input buttons. In order to instruct the search the user presses the first button for the first search category of metadata. The user then presses the function key to specify the search operator to use, followed by a subsequent search shortcut button. If the OR search operator is instructed by button "1" on the remote then a sequence of button presses "Yellow", "1", "#", would initiate a search for programs with the same director or leading female factor as the selected program. Because operators are used after an initial instruction to perform a search, the operator buttons can have a different primary function which is switched to a secondary operator function when a search shortcut button is pressed. For example, the "1" key may be used primarily to select program 1 during normal operation, but pressing a search shortcut button causes the secondary search operator functionality to be activated. The mapping stored in memory 8, for search operator short keys may only apply when a first search shortcut button has been pressed. This allows dual functionalities to be applied to a given button.

As mentioned above, metadata may be provided in a number of ways. Embodiments of the invention may rely on searching metadata of the sort used to populate an EPG. The metadata may be broadcast to the STB and sorted in local memory such as RAM or a hard disk drive. Alternatively, the metadata may be stored at a remote location, such as a remote server, and communicated to the STB over a connection such as an Internet connection when required.

The program metadata is preferably provided in the EIT table. In particular, the program metadata is provided within descriptors in the table. Most preferably, the data fields and accompanying data, such as the text data, for a particular program are provided within one or more extended event descriptors within the EIT. The format of the EIT extended event descriptor is shown in FIG. 3, as provided by the DVB-SI standard. The descriptor, or multiple descriptors, contain text based descriptions of various properties of a program or event. Each property is defined by a particular metadata field, with accompanying data representing the description of that property/data field for a given program or event. The text data within the descriptor(s) is typically parsed so as to produce a two columned table for each program indicating the data field and the accompanying description for that program.

The searching performed by the processor may involve matching text strings with other identical text strings, but it will be appreciated that other types of searching may be used to improve accuracy or accommodate for small potential differences in data field entries. For example, fuzzy searching or approximate string matching may be used, or automatic wild cards for example. Any appropriate searching method may be used in order to find equivalent data in a data field, meaning data which is intended to be substantially the same as, or similar to, other data.

Figure 4:
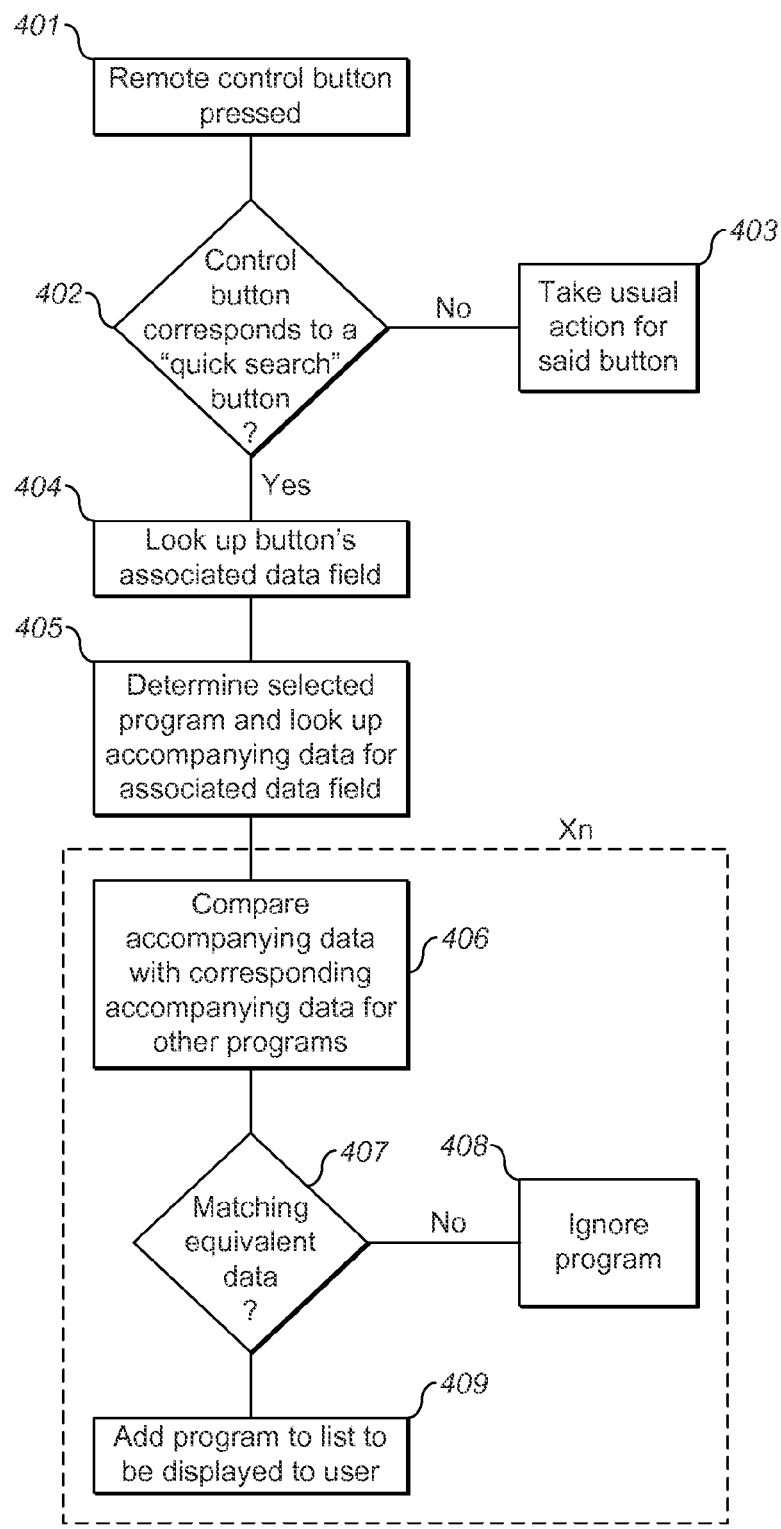
FIG. 4: is a flow chart of a method according to an embodiment of the present invention.

FIG. 4 shows an example of the method steps involved in performing a search in accordance with embodiments of the present invention. Initially, at step 401, it is determined by the STB when a remote control button is pressed. It is then determined, at step 402, whether this control button corresponds to a "quick search" button, being a button of the remote control associated with a particular data field contained within metadata. This can be determined by looking up in a table if the activated button corresponds to a quick search button. If the control button does not correspond to a quick search button, then the usual action associated with that button (for example, a channel change or volume increase) is performed by the STB. If, however, the remote control button corresponds to a quick search button then it is determined, at step 404, what metadata field that particular button is associated with. At step 405, the selected program is determined, as described above, and a look up of the data table stored in memory is performed to determine, for the selected program, the accompanying data for the particular data field associated with the quick search button. Following this, there is a comparison performed of the accompanying data with the corresponding accompanying data for the other available programs whose data is also contained in the metadata. It is then determined at step 407, for each program being searched, whether the accompanying data matches, or is equivalent to, the accompanying data of the selected program. If the data is not equivalent, then the program is ignored. If it is equivalent, then the program is added to a list of programs, data related to which is to be displayed to the user, at step 409. Preferably, the data relating to the matching programs includes at least the title of the program. The steps 406-409 are repeated for each program for which there is metadata available until all programs have been searched. The list is then displayed to the user who may select any of the resulting programs for further action, such as viewing, recording or obtaining from another source such as via an internet server for on demand viewing.

Embodiments find particular utility with STBs and receivers for television programs, but this is not a limitation of the invention. Embodiments may find use in any sort of media device that receives or uses accompanying metadata describing a program or event.

Embodiments have been described referring to an input device having a plurality of inputs in the form of buttons. This relates generally to a remote control device such as a television or STB remote. It will be appreciated that the term "button" is intended to refer to a single user input of the user device and may not require a physical button as such. For example, a touch screen, having different portions of the screen for issuing different instructions may be considered to have a number of buttons. The input provided by the user to the input device may conceivably include movement of the input device, the input device having one or more motion or movement sensors to convert particular movement inputs into instructions.

The invention claimed is:

1. A method for searching metadata associated with television programs in a media device controlled by a remote control device having a plurality of buttons, the method comprising:
receiving metadata associated with television programs at the media device, the metadata comprising a plurality of data fields populated with accompanying data for each of a plurality of television programs;
associating a first button of the remote control device with a first data field of the metadata;
receiving a first instruction from the remote control device corresponding to a selection of the first button;
comparing accompanying data of the first data field for a program currently being presented with first corresponding accompanying data of at least a subset of the plurality of television programs;
presenting a first program list, the first program list including those television programs having substantially equivalent data in the first data field as the program currently being presented;
associating a second button of the remote control device with a second data field of the metadata;
associating a third button of the remote control device with a logical search operator;
determining when said third button is activated and, in response, adjusting the search in accordance with the logical search operator;
receiving a second instruction from the remote control device corresponding to a selection of the second button;
determining that a time period between receiving the first instruction and receiving the second instruction is below a threshold time period;
in response to the determination of the time period, comparing accompanying data of the second data field, for the program currently being presented, with second corresponding accompanying data of the first program list; and
presenting a second program list including those television programs from the first program list having substantially equivalent data in the second data field as the program currently being presented.

2. The method according to claim 1, wherein the program currently being presented is selected by:
controlling the media device to output the program to a display; or
selecting the program within a menu such as an electronic program guide.

3. The method according to claim 1, wherein the data fields include one or more of:
program title;
one or more actors appearing in the program;
program director; and
category of the program.

4. The method according to claim 1, wherein the step of presenting a first program list relating to those television programs having substantially equivalent data in the first data field comprises highlighting matching television programs in a list output on a display.

5. A method according to claim 1, further comprising:
waiting a predetermined period of time after determining the first button is activated before comparing the accompanying data of the first data field;
determining, during the predetermined period, whether one or more further buttons of the remote control device are activated; and, if they are:
comparing accompanying data of further data fields, for a first program, with third corresponding accompanying data of at least a second subset of the plurality of television programs; and
presenting data relating to those television programs having substantially equivalent data in an associated data field of all activated buttons.

6. A system for searching metadata associated with television programs comprising a media device and a remote control device having a plurality of buttons for controlling the media device, the media device comprising:
an input for receiving metadata associated with television programs comprising a plurality of data fields populated with accompanying data for each of a plurality of television programs;
at least one memory storing the metadata and for storing associations between a plurality of buttons of the remote control device and respective data fields associated with each button of the plurality of buttons of the remote control device; and
at least one processor configured to:
receive a first instruction from the remote control device corresponding to a first button of the plurality of buttons associated with a first data field of the metadata;
compare accompanying data of the first data field for a program currently being presented with first corresponding accompanying data of at least a subset of the plurality of television programs;
present a first program list including those television programs having substantially equivalent data in the first data field;
associate a second button of the remote control device with a second data field;
subsequent to receiving the first instruction, receiving a subsequent instruction from the remote control device corresponding to a selection of a third button, wherein the third button is characterized by a first operation when selected during normal operation, and wherein the third button is associated with a second operation comprising providing a logical operator when selected subsequent to a selection of the first button or second button;
receive a second instruction from the remote control device corresponding to a selection of the second button;
determine that a time period between receiving the first instruction and receiving the second instruction is below a threshold time period;
in response to the determination of the time period, compare accompanying data of the second data field for the program currently being presented, with second corresponding accompanying data of the first program list; and
present a second program list including those television programs from the first program list having substantially equivalent data in the second data field as the program currently being presented.

7. The media device according to claim 6, wherein the processor is configured to associate one or more of the buttons of the remote control device with one or more respective data fields based upon user input.

8. The media device according to claim 6, wherein the memory for storing the associations is located at the remote control device or at the media device.

9. The media device according to claim 6, wherein the media device is a television receiver or set-top-box.

* * * * *